UNITED STATES PATENT OFFICE 2,259,871

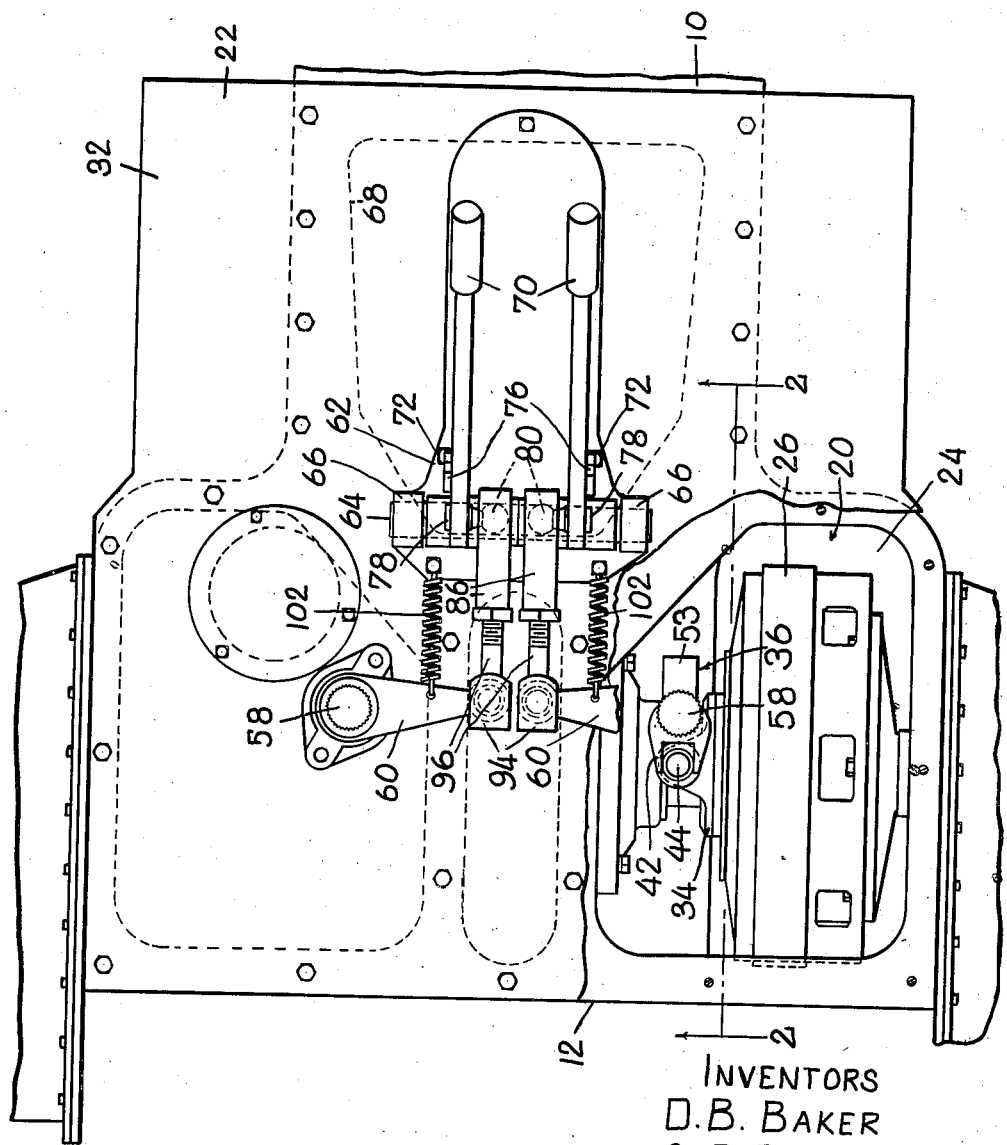

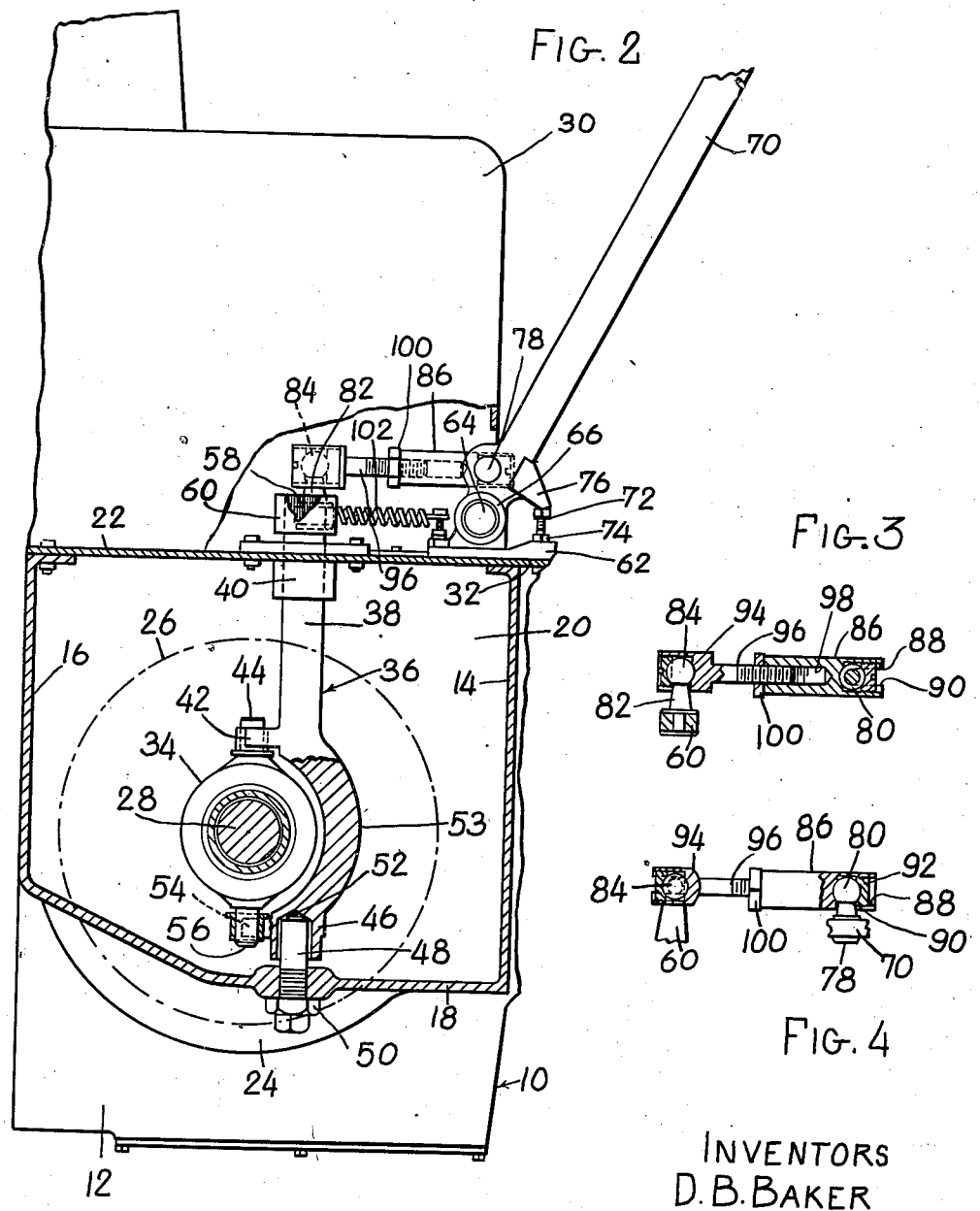

CLUTCH CONTROL

David B. Baker, Riverside, Clifford R. Rogers, Oak Park, and William O. Bechman, Chicago, Ill., assignors to International Harvester Company, a corporation of New Jersey Application July 25, 1939, Serial No. 286,380

3 Claims. (Cl. 180—9.2)

This invention relates to a clutch and more particularly to an improved actuating means for the clutch. The invention particularly contemplates improvements in actuating mechanism for steering clutches of the type utilized in crawler tractors.

In ordinary crawler tractor constructions, the tractor is provided with a main frame having a rear housing part provided with a pair of clutch compartments, each of which contains a steering clutch comprising part of the tractor driving mechanism. Ordinary control means for the clutches comprises a rock-shaft for each clutch, the rock-shaft carrying a yoke engaging a throw-out collar associated with the respective clutch. Because of the necessity of providing the throw-out member comprising the rock-shaft and yoke of sufficient strength to withstand the stresses of normal usage, it has been customary to dispose the rock-shaft on an axis spaced a substantially great distance away from the transverse axis on which the clutches are mounted. The increase in this distance results in a consequent decrease in leverage obtainable to actuate the clutches. It is, therefore, necessary to provide complicated control means for rocking the rock-shafts in order that the clutches may be easily operated. It will be appreciated that this creates quite a problem in tractors where operation of the clutches is effected manually. The problem becomes of increasing importance where it is desired to provide a compact organization and arrangement of parts so that the operator may have sufficient room at the operator's station to mount and dismount from the tractor and to operate other tractor controls.

The principal object of the present invention is to provide in a vehicle, and especially in a crawler tractor, improved clutch actuating means providing effective leverages for easy control of the clutches.

An important object is to provide the actuating means in the form of a rock-shaft and yoke disposed on an axis closely spaced from the axis of the clutch, thus providing shorter throw-out arms on the member, with a consequent increase in leverage.

Another important object is to provide for a desired arrangement of a control member and throw-out member with respect to the disposition of the axis of the clutch mechanism.

Another object is to provide a control member which may be selectively positioned according to the desires of the operator and to combine therewith adjustable connecting means between the control member and the clutch actuating means which may be adjustable to compensate for clutch wear without altering the selected position of the control member.

Another object is to provide for positioning of the control member independently of the adjustable means associated with the clutch actuating means.

Still another object is to interconnect the control means and the actuating means by close-coupled linkage including ball and socket joints compensating for the different planar movements of the control member and actuating means.

And still another object is to provide resilient means interconnected with the connecting linkage for retaining the position of the control member as selected.

And still another object is to provide journaling means for the throw-out rock-shaft or actuating means which is adjustable to arrange the actuating means accurately with respect to the clutch mechanism.

Briefly, these and other important objects are achieved in one preferred form of the invention in a crawler tractor having a main frame including a rear housing part formed with top and bottom, and rear and front walls. These walls provide a compartment in which a steering clutch is carried on a shaft disposed on a transverse axis. The preferred form of actuating means comprises a vertically disposed rock-shaft member rockable on a vertical axis spaced forwardly of the clutch shaft axis a distance slightly greater than the radius of the clutch shaft. The rock-shaft is adjustably journaled at its lower end in the bottom wall of the housing and extends through and above the upper wall, being journaled therein. An operator's station is carried by the main frame above the housing and has its front portion disposed substantially in the plane of the front wall of the compartment. A control lever is carried by the housing on a transverse axis disposed in close proximity to the front portion of the operator's station. The lever extends upwardly within easy reach of an operator on the station, and adjustable means are provided for adjusting the lever to any selected position.

The end of the rock-shaft extending above the top wall of the housing is splined and carries thereon a removable arm which is connected by adjustable linkage to the control lever.

A more complete understanding of the desirable objects and features of the present invention may be had from the following description taken in conjunction with the accompanying sheets of drawings, in which:

Figure 1 is a plan view of a gear portion of a crawler tractor with certain parts omitted for the purposes of disclosure;

Figure 2 is a longitudinal sectional view taken substantially along the line 2—2 of Figure 1;

Figure 3 is a detail sectional view of the connecting linkage between the control member and the clutch actuating means; and, Figure 4 is a plan view, partly in section, of the same.

It will be understood that the improved clutch and actuating mechanism herein disclosed are adaptable for use in any type vehicle and that the particular type of crawler tractor herein disclosed has been chosen merely for the purposes of illustrating a preferred form of the invention.

In the drawings, 10 indicates the main frame of a crawler tractor, the frame being provided with a rear housing part 12 having integral front, rear and bottom walls 14, 16 and 18, respectively. These walls provide a clutch compartment 20 which is closed at its top by a platform or cover part 22 serving as an upper or top wall of the housing part 12. It will be understood that there are two such compartments in the housing 12, disposed in transverse alinement. The bottom wall 18 of each compartment 20 is provided with an additional integral bottom wall portion 24 extending downwardly from the main bottom wall. These portions 24 are located at the outer sides of the compartment and are provided for the purpose of containing a pair of steering clutch units 26, respectively. The steering clutches are mounted on a transverse shaft assembly 28 which extends transversely across the clutch compartments 20 and which includes thereon drive gearing, not shown, suitably driven by the tractor engine and transmission, also not shown. The steering clutch units comprise part of the driving mechanism for driving oppositely disposed track chains, not shown.

An operator's station 30 is carried on the main frame above the housing 12 substantially over the compartments 20, a front portion of the station or seat being substantially in alinement with the front walls 14 of the compartments. The location of the operator's seat in this position is in accordance with the necessity for providing a substantially level platform forwardly of the station. In the present instance, the cover or platform part 22 extends forwardly at 32 and overlies other portions of the tractor main frame.

The following description will pertain to only one steering clutch unit and the actuating means therefor, it being understood that a similar arrangement is provided at the other side of the housing. The clutch unit 26 includes a throw-out collar 34 which is associated therewith and with the shaft 28 for movement axially of the shaft to engage and disengage the clutch driving elements. The arrangement of the throw-out collar 34 with respect to the clutch unit is more or less conventional. The improved clutch actuating means comprises a clutch throw-out member 36 rockable on a vertical axis spaced forwardly of the clutch shaft axis a distance slightly greater than the radius of the clutch shaft. This arrangement of parts is best shown in Figure 2. The member 36 preferably comprises a first rock-shaft part 38 journaled adjacent one end in a bearing 40 in the top wall or platform 22 of the housing 12. The lower end of the shaft terminates at one side of the periphery of the throw-out collar 34 and is provided thereat with an integral arm 42 engageable through suitable means in the form of a stud 44 with the throw-out collar. A coaxial second rock-shaft part 46 is journaled in the bottom wall 18 of the housing through the medium of an adjustable means in the form of a threaded member 48 carried by the bottom wall 18 and provided with a locking member in the form of a nut 50. The second rock-shaft part is bored axially and receives the vertically extending end of the member 48. The member 48 is provided with a bearing portion 52 which simulates a ball and which provides a suitable bearing for the rock-shaft part 46. The rock-shaft parts 38 and 46 are disposed coaxially and are rigidly interconnected by an arcuate intermediate portion 53, which embraces the throw-out collar 34, spanning the ends of the rock-shaft parts. The upper end of the rock-shaft part 46 terminates substantially at the other side of the throw-out collar 34 and is provided thereat with a throw-out arm 54 which engages the throw-out collar through the medium of a stud 56 disposed diametrically opposite the stud 44 forming the point of engagement between the first rock-shaft arm 42 and the throw-out collar 34. It will be noted at this point that the closely spaced relation of the axes of the shaft 28 and throw-out member 36 results in short arms 42 and 54. By this means, considerably greater leverage is obtained for shifting the throw-out collar 34 axially for disengaging the clutch 26.

The first rock-shaft part 38 extends vertically upwardly through and above the top housing or platform part 22 and is provided thereat with a splined or serrated end portion 58. An arm 60 provided with a corresponding internally splined or serrated opening is fitted on the splined end 58 of the rock-shaft part 38 and extends transversely toward the center line of the housing part 12. This arrangement is best shown in Figure 1. The platform part 22 carries, through the medium of a bracket 62, a transverse rock-shaft 64 disposed on a transverse axis lying parallel and in close proximity to the front portion of the operator's station 30 and the front wall 14 of the compartment 20. This shaft 64 is preferably rigidly carried in a pair of spaced bearing portions 66 formed on the bracket member 62. The bracket member 62 preferably comprises a forwardly extending cover plate for a transmission compartment 68 indicated in dotted lines in Figure 1. This structure forms no part of the present invention except insofar that it provides, in the present disclosure, for the disposition of the axis of the rock-shaft 64.

Two control members 70 in the form of hand levers are separately journaled on the rock-shaft 64 for movement longitudinally of the tractor. These members extend within easy reach of an operator on the operator's station 30, and means are provided for adjusting the positions of the levers as desired by the operator. Further reference will be had to only one of the levers, since the arrangements of both are the same. The means for adjusting the position of the lever comprises a stud 72 preferably threaded into a vertical bore provided in the bracket member 62. The stud is provided with a locking member in the form of a nut 74 for maintaining the position of the stud. The head of the stud engages a forwardly extending portion 76 formed at the lower end of the lever 70.

The lever 70 includes at its lower end above the rock-shaft 64 a transversely extending member 78 formed at its inner end with a ball 80. The inner end of the arm 60 carried by the clutch throw-out member 36 is provided with a similar member 82 extending vertically and provided with a ball 84. Means is provided for interconnecting the lever 70 and the arm 60, and comprises closely connected adjustable linkage including a sleeve member 86 formed at its forward end with a bore 88 slotted or opened at one side as at 90 to receive the ball 80 provided on the member 78 carried by the lever 70. A plug 92 is threaded into the bore 88 for retaining the connection between the members 78 and 86. A second part of the linkage comprises a member 94 having a threaded portion 96 adjustably threaded into a threaded bore 98 provided axially in the member 86. The member 94 is provided at its rearward end with means for receiving the ball 84 on the member 82 carried by the arm 60. This means is similar to the means previously described for forming the connection between the member 86 and the lever 70. A locking member in the form of a nut 100 is threaded on the threaded portion 96 of the member 94 for maintaining the adjusting position of the linkage. A tension spring 102 is connected to the member 60 for maintaining a forward position of the member, the spring thus serving, through the intermediary of the previously described connecting linkage, to maintain the position of the lever 70 against the adjusting stud 72.

From an examination of Figure 2, it will be seen that the axes of the shaft 28 and the rock-shaft 64 are comparatively closely spaced, and that the vertical axis of the rockable throw-out member 36 is disposed between these axes. This arrangement of parts provides for a close coupled, compact arrangement of parts, and the particular location of the throw-out member axis with respect to the axis of the shaft 28 provides for increased leverage, thus enabling the operator to easily disengage the clutches. It will be noted here that the movement of the arm 60 is in a horizontal plane, while the movement of the lever 70 is in a vertical plane. The desirable type of linkage interconnecting these two parts includes the previously described ball and socket connections, thus compensating for the different planar movements.

The adjusting means 48 provided for journaling the lower end of the rockable member 36 provides for vertical adjustment of that member with respect to the throw-out collar 34. This adjustment is desirable to compensate for the wear in the parts and for irregularities arising during manufacture. The means also permits easy removal of the throw-out member 36, in which event it is necessary only to remove the means 48 and the upper bearing 40. The member 36 may then be removed without disturbing the clutch unit 26.

The desirable adjustment provided between the lever 70 and the throw-out member 36 provides, as previously mentioned, for selectively locating the lever 70 independently of clutch adjustment. In selecting a desirable position of the lever 70, the connecting linkage is first adjusted until the desired position of the lever is obtained. The adjustable stud 72 is then adjusted vertically until it engages the portion 76 of the lever 70, and there is thus provided a stop means for maintaining the desired position of the lever. The splined arm 60 may be readily removed from and replaced on the splined end 58 of the rock-shaft part 38 comprising part of the clutch throw-out member 36. During the adjustment, the adjusted position of the clutch 26 has not been disturbed. After a desired position of the control member 70 has been obtained, the operator becomes accustomed thereto and, ordinarily, clutch wear would result in changing this position. In the adjustable connection provided by the present invention, however, the desirable location of the lever 70 need not be lost through wear in the clutch. When it is desired to adjust the clutch for wear, it is necessary merely to remove the arm 60 from the rock-shaft part 38 and to replace the same thereon in a desired position in accordance with the amount of wear that has taken place in the clutch. It will be understood, of course, that it is desirable to maintain the position of the arm 60 as extending transversely of the housing or parallel to the axis of the rock-shaft 64. Since the splines or serrations on the end portion 58 of the rock-shaft part 38 are comparatively fine, rather minute adjustments may be made. Since the clutch throw-out collar is not rigidly interconnected with any clutch part, the tension on the spring 102 has no effect on the clutch and serves as a desirable means for aiding in maintaining a selected position of the control lever 70.

From the foregoing description, it will be seen that a desirable embodiment of the invention has been provided for attaining the objects previously set forth. The preferred construction contains other features which will be readily apparent to those skilled in the art. It will be understood, of course, that numerous modifications and alterations may be made in the preferred construction without departing from the spirit and scope of the invention as defined in the appended claims.

What is claimed is:

1. In a tractor having a main frame including a housing provided with top and bottom and front and rear walls forming a compartment, an operator's seat located above the compartment and having its front portion substantially in alinement with the front wall of the compartment, a control member pivotally carried above the housing on an axis substantially in the plane of the front portion of the seat, said member extending upwardly in a selected position ahead of the seat, means for adjusting the member to a selected position, a shaft disposed transversely in the compartment rearwardly of the pivot axis of the member, clutch mechanism on the shaft, clutch throw-out means in the compartment including a member rockable on a vertical axis disposed between the shaft axis and the control member pivot axis, and means inter-connecting the control member and the rockable member, said means including an arm rigidly and adjustably carried by the rockable member and adjustable linkage between the arm and the control member.

2. In a tractor having a main frame including a housing, a shaft carried in the housing on a transverse axis, a clutch on the shaft, a control member carried by the housing and rockable on a transverse axis spaced from the shaft axis, and a clutch throw-out rock-shaft rockable on a vertical axis disposed between the aforesaid two axes, said rock-shaft axis being spaced from the clutch axis a distance slightly greater than the radius of said clutch shaft.

3. In a vehicle, having a main frame including a housing provided with top and bottom walls, a clutch carried in the housing between the walls and on a transverse axis, a throw-out shaft rockable on a vertical axis, means in the top wall journaling one end of the throw-out shaft, and vertically adjustable means in the bottom wall journaling the other end of the throw-out shaft.

DAVID B. BAKER.
CLIFFORD R. ROGERS.
WILLIAM O. BECHMAN.